United States Patent [19]

Simmons

[11] 4,133,773

[45] Jan. 9, 1979

[54] APPARATUS FOR MAKING FOAMED CLEANING SOLUTIONS AND METHOD OF OPERATION

[75] Inventor: Bobby G. Simmons, Tulsa, Okla.

[73] Assignee: The Dow Chemical Company, Midland, Mich.

[21] Appl. No.: 819,748

[22] Filed: Jul. 28, 1977

[51] Int. Cl.[2] .......... B08B 9/00; B01J 13/00

[52] U.S. Cl. .......... 252/359 E; 134/22 R

[58] Field of Search .......... 252/359 E; 239/428, 239/8; 261/DIG. 26, 124; 366/604, 178; 134/22 R, 36

[56] References Cited

U.S. PATENT DOCUMENTS

| | | | |
|---|---|---|---|
| 2,575,675 | 11/1951 | Morgan | 252/359.5 |
| 3,037,887 | 6/1962 | Brenner et al. | 134/36 |
| 3,212,762 | 10/1969 | Carroll et al. | 261/124 |
| 3,238,021 | 3/1966 | Webber et al. | 261/124 |
| 3,322,684 | 5/1967 | Gibson et al. | 252/359.5 |
| 3,436,262 | 4/1969 | Crowe et al. | 134/10 |
| 3,618,856 | 11/1971 | Sachnik | 252/359 E |
| 3,675,901 | 7/1972 | Rion | 366/178 |
| 3,822,217 | 7/1974 | Rogers | 252/359 E |
| 3,874,926 | 4/1975 | Horne et al. | 134/24 |

*Primary Examiner*—S. Leon Bashore
*Assistant Examiner*—Chris Konkol
*Attorney, Agent, or Firm*—V. Dean Clausen

[57] ABSTRACT

The apparatus of this invention is designed for making foamed liquid solutions. In a specific application the foamed liquid is used for removing scale deposits from the interior surfaces of vessels, such as heat exchangers. The apparatus includes a foam chamber with a gas disperser section positioned inside the chamber. Ahead of the foam chamber is a final mixing section with a static mixer installed therein. A liquid concentrate, such as an acid solution, and a diluent liquid, such as water, are passed into the foam chamber. The liquids are mixed in the foam chamber and gas is bubbled into the liquid phase through the disperser section. The flow of gas and liquid into the foam chamber is controlled by flow regulators to achieve a continuous and uniform blending of the gas and liquid phases. From the foam chamber the foamed solution is carried into the final mixing section and passed through the static mixer to obtain a homogeneous cleaning solution, which is discharged into the vessel to be cleaned.

4 Claims, 2 Drawing Figures

APPARATUS FOR MAKING FOAMED CLEANING SOLUTIONS AND METHOD OF OPERATION

BACKGROUND OF THE INVENTION

This invention relates to an apparatus and method for making foamed liquid cleaning solutions. In a specific application the foamed liquid solutions are used for cleaning the interior surfaces of rigid vessels, such as heat exchangers.

There are several types of vessels, such as shell and tube heat exchangers, in which water is used as a heat transfer fluid. Usually the water will contain dissolved materials, such as metal oxides, inorganic salts, and the like. Over a period of time the dissolved materials will form scale deposits on the inside surfaces of the tubes, which make up the tube bundle in the vessel. These scale deposits must be removed periodically to permit the heat exchanger to operate effectively.

A common technique for removing scale deposits from the interior surfaces of tubes in a heat exchanger is to circulate, under pressure, a foamed cleaning solvent through the scale-coated passages. A typical apparatus and method used in a foam cleaning operation is described in U.S. Pat. No. 3,212,762. The cleaning solvent employed in this operation is an aqueous solution of hydrochloric acid. The composition also contains ammonium bifluoride, to help remove scale containing silicate compounds, and a suitable foaming agent.

In a typical operation, the cleaning composition is premixed and held in a tank truck. From the tank truck the cleaning composition is pumped into aerator tanks in a foam generator. A pair of cylindrical sparger tubes, which are fabricated of an aluminum silicate material, are positioned in each aerator tank. In operating position the sparger tubes are partially submerged in the cleaning liquid. The foam composition is generated in each aerator tank by forcing compressed air through the pores in each sparger tube. From the aerator tanks the foam composition flows into an adjacent tank, and is forced through a discharge line into the vessel to be cleaned.

The foam generator described above has several disadvantages from the standpoint of commercial use. One disadvantage is that the sparger tubes disintegrate in a relatively short time, due to attack by the ammonium bifluoride on the aluminum silicate composition in the sparger tubes. Another disadvantage is that the compressed air used to foam the cleaning solvent is sometimes contaminated with entrained oil. During a foaming operation the oil will coat the inner surfaces of the spargers. This results in a fairly rapid breakout of the foam, i.e. most of the foam composition reverts back to a liquid phase. Another disadvantage of this apparatus is that the discharge line, from the foam generator to the vessel being cleaned, should be a fairly large diameter line. If a small diameter line is used, i.e. less than about 4 inches, the resulting back pressure against the spargers (above 15 psig) may cause the spargers to burst.

Another disadvantage of this apparatus is that the rate of air flow to the spargers cannot be stepped up to get a higher ratio of foam to liquid in the cleaning composition. If the air velocity is increased the air stream will pass through the pores of the spargers in the form of jets. These jets of air thus form large bubbles in the liquid and thereby inhibit the foam dispersion. Another disadvantage is that this apparatus generally requires a recycle pump. The pump is necessary for recirculating of excess liquid, caused by foam breakout, from the holding tank back through the spargers in the aerator tanks.

SUMMARY OF THE INVENTION

The apparatus of this invention is designed for generating foamed fluids. These foamed fluids can be used in various applications, such as removing scale deposits from the interior surfaces of vessels, and for injection into a well bore to stimulate oil or gas recovery. The generator apparatus includes a first conduit which defines a foam chamber. A second conduit, which communicates with the foam chamber, provides an inlet for carrying a liquid concentrate into the foam chamber. A third conduit, in communication with the foam chamber, defines an inlet for carrying a diluent liquid into the foam chamber. The concentrate and diluent liquids are mixed inside the foam chamber to provide a liquid solution.

A flow regulator installed in the second conduit regulates the flow of the liquid concentrate into the foam chamber. A similar flow regulator is installed in the third conduit to regulate the flow of the diluent liquid into the foam chamber. A fourth conduit, which communicates with the foam chamber, defines an inlet for carrying a gas into the foam chamber. A gas disperser section is connected into one end of the fourth conduit. In operating position the gas disperser section is positioned inside the foam chamber.

in the operation of this apparatus the gas is dispersed in the liquid solution to form a foamed fluid. The flow of gas into the foam chamber is controlled by another flow regulator installed in the fourth conduit. The front end of the foam chamber is connected into a fifth conduit which is positioned crosswise of the foam chamber. Positioned inside of the fifth conduit are two mixing devices, one on either side of the foam chamber. These mixing devices provide a means for final mixing of the gas and liquids to obtain a homogeneous foamed fluid. The fifth conduit has at least one open end which is spaced from the foam chamber. The open end is adapted for connection into a discharge line.

DESCRIPTION OF A PREFERRED EMBODIMENT

Figure 1:
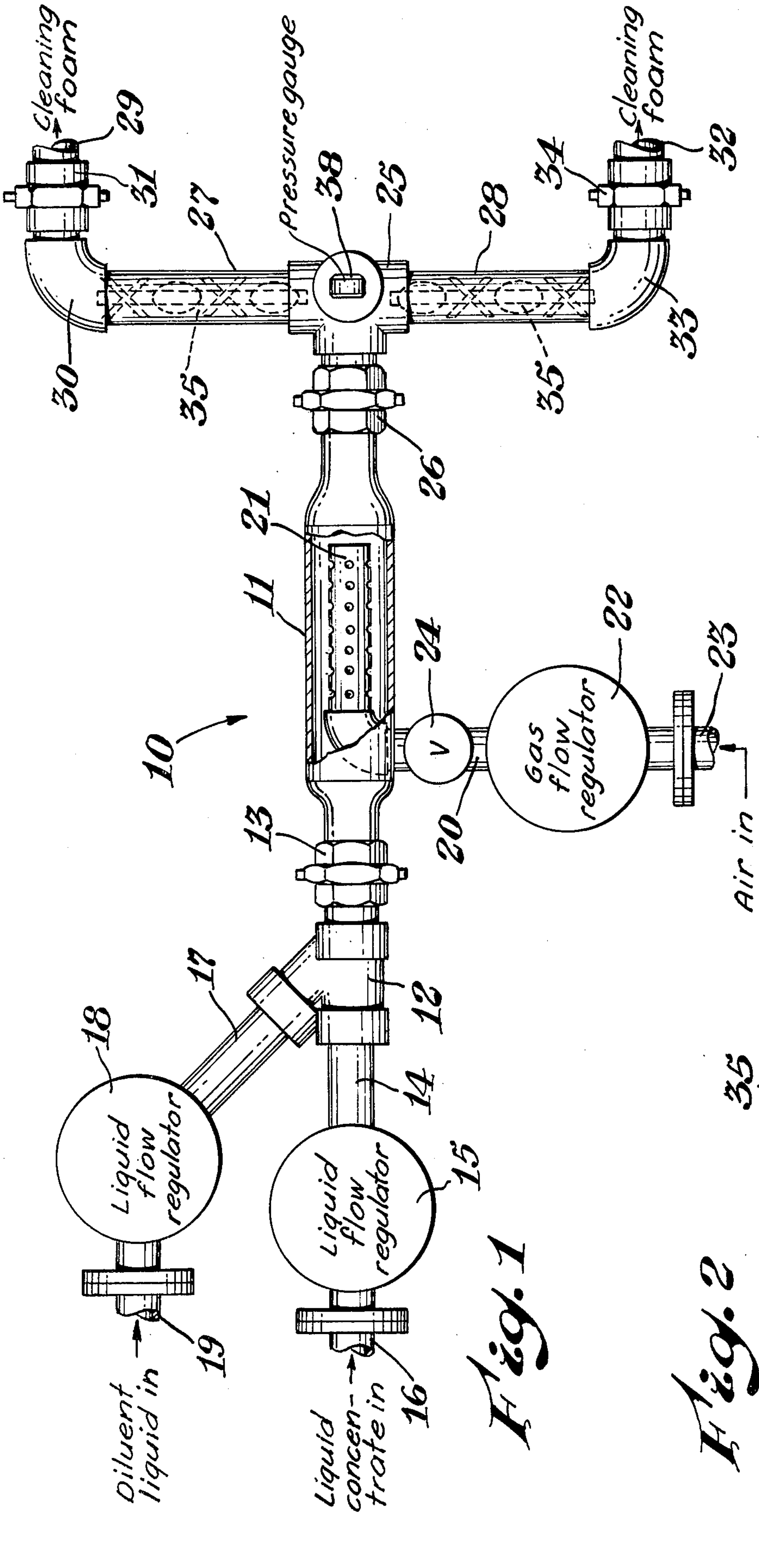
FIG. 1 is a plan view, partly in section, of the foam cleaning apparatus of this invention.

Referring to the drawing, particularly FIG. 1, the numeral 10 generally designates one embodiment of a foam cleaning apparatus according to this invention. The basic structure of apparatus 10 consists of several conduit sections which are connected together. One of these conduit sections, which is the largest diameter section, serves as a foam chamber 11. At the back end, the chamber 11 is coupled into one end of a Y-bend fitting 12, by a union fitting 13.

The opposite end of fitting 13 connects into one end of an inlet conduit 14. At the opposite end of conduit 14 a liquid flow regulator unit 15 is connected into the conduit. A delivery line 16 is connected into the inlet side of the flow regulator unit 15. In a cleaning operation line 16 provides a means for carrying a liquid concentrate from a tank truck, or other batch container, into the foam chamber 11 through inlet 14.

A second inlet conduit 17 is connected at one end into the lateral branch of fitting 12. A second liquid flow regulator 18 is installed at the opposite end of conduit 17. One end of a delivery line 19 is connected into the inlet side of flow regulator 18. In a cleaning operation a diluent liquid, such as water, is carried from a holding container through the line 19 and inlet 17 into the foam chamber 11. Another inlet conduit 20 is connected at one end into the side of the foam chamber 11, near the back end of the chamber.

A short pipe section 21, having small openings therein, is connected at one end into the front end of conduit 20. In operating position, the pipe section 21 is positioned inside foam chamber 11, and provides a means for dispersing (sparging) gas into the foam cleaning solution. The other end of conduit 20 connects into the outlet side of a gas flow regulator unit 22. On the inlet side, an air delivery line 23 is connected into the flow regulator 22. A check valve 24 is installed in conduit 20 between the regulator 22 and foam chamber 11.

The forward end of foam chamber 11 is coupled into the branch of a tee fitting 25, by a union fitting 26. A final mixing section is defined by two conduit sections, indicated by numerals 27 and 28.

Although the final mixing section of the apparatus illustrated herein is made up of the two conduit sections 27 and 28, the apparatus is not limited to this structure. For example, the final mixing section could comprise a single conduit.

One end of the conduit 27 is connected into the left side of the run in fitting 25. The opposite end of conduit 27 is coupled into a discharge line 29 by an elbow fitting 30 and a union fitting 31. Conduit 28 is connected at one end into the right side of the run in fitting 25. At the opposite end conduit 28 is coupled into a discharge line 32 by an elbow fitting 33 and a union fitting 34.

Figure 2:
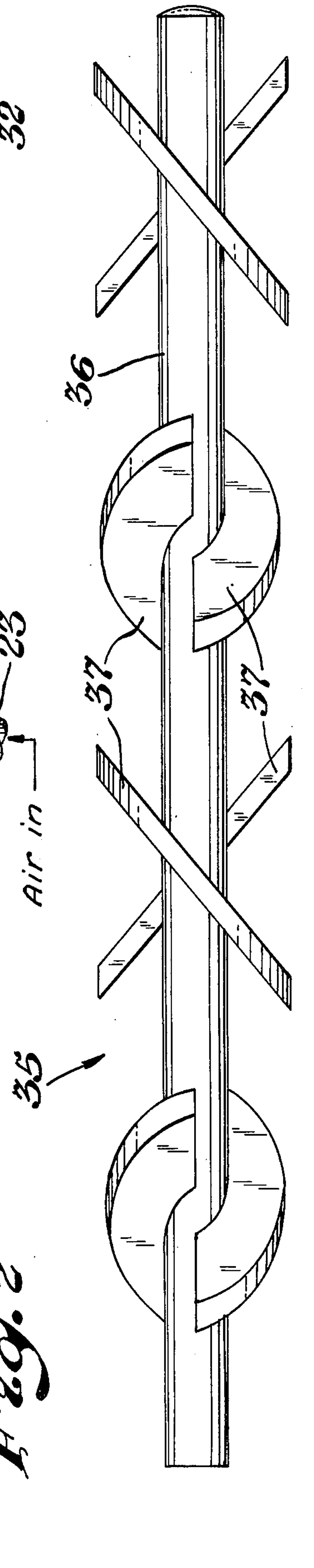
FIG. 2 is a front elevation view, in enlarged detail, of a mixing device which forms a part of the foam cleaning apparatus illustrated in FIG. 1.

A static mixer device 35 is positioned in each of the conduits 27 and 28 is a mixer device 35. The structure of the mixer device 35 is best illustrated in the enlarged detail view of FIG. 2. Referring to FIG. 2, the mixer device 35 is made up of an elongate rod 36, on which are mounted semi-elliptical plates 37. As shown in the drawing, plates 37 are mounted in spaced pairs on rod 36, and in diagonal relation to the axis of the rod.

The general structure and operation of a suitable mixer device 35 is described in U.S. Pat. Nos. 3,404,869; 3,583,678; and 3,652,061. This mixer device, which is referred to as a low pressure drop motionless mixer, is available as a commercial item from Charles Ross & Son Company, Hauppauge, Long Island, New York. In the practice of this invention the Ross mixer would be positioned loosely in the conduit sections 27 and 28.

A typical cleaning operation will now be described to illustrate the practice of this invention. In this operation the vessel to be cleaned is referred to as a double pass shell and tube heat exchanger (not shown). The cleaning solvent is a premixed composition containing, by weight, 32 percent aqueous hydrochloric acid, about 0.2 percent of an amine-type acid inhibitor, and about 5.0 percent of an organic surfactant. The solvent composition (referred to herein as the liquid concentrate) was pumped from a tank truck (not shown) into the foam chamber 11 through the delivery line 16, flow regulator 15 and inlet 14.

Water for diluting the acid solution (referred to herein as the liquid diluent) was pumped from another tank container (not shown) into the foam chamber 11 through delivery line 19, flow regulator 18 and inlet conduit 17. The flow regulators 15 and 18 were set to maintain the flow of acid solution and water into chamber 11 at a constant rate. The flow rate was adjusted to provide for diluting the cleaning solution to a composition containing about 7.5 percent hydrochloric acid, by weight.

From a compressor (not shown) air was pumped into foam chamber 11, through line 23, flow regulator 22, conduit 20, check valve 24, and the disperser section 21. As the air passed through the small openings in disperser section 21, it bubbled into the cleaning solution in foam chamber 11, to generate a foam phase in the chamber. The check valve 24 prevents any possibility of back flow of the acid-based cleaning solution into the gas flow regulator 22.

From chamber 11 the foam solution passes through fitting 25 and into the conduit sections 27 and 28. As the solution flows through each of the conduit sections, the mixer device 35 continuously splits the main stream and redirects the substreams to produce a homogeneous blend. The foam blend is then carried into the tubes of the heat exchanger through the discharge lines 29 and 32.

The reason for discharging the foam cleaning composition through two outlet lines at the same time is related to the structure of a double pass heat exchanger. For example, in a double pass heat exchanger the tube side fluid flows through only one half of the tubes in the tube bundle on the first pass. At the opposite end of the tube bundle, the fluid reverses and flows back through the other half of the tubes on the second pass. In practice, it was found that if the cleaning foam was discharged into the tube bundle through only one outlet, the distance the foam had to traverse in making a double pass was too great to maintain the foam quality necessary for removing the scale deposits in the tubes. By using a double outlet, therefore, both half sections of the tube bundle can be cleaned in a single pass.

It will be understood that the invention is not limited to the apparatus illustrated herein. In many cleaning operations, and other operations which utilize a foamed composition, it may be desirable to deliver the foam to the point of use through a single outlet line. The present apparatus can also be modified to include more than one final mixing section, with the foam composition being delivered from each mixing section to one or more points at the same time.

In the practice of this invention it is essential to maintain the flow of the foam solution into the vessel to be cleaned at a constant rate, to achieve a thorough cleaning job. A constant flow rate is maintained by keeping the inlet pressure (pressure at each flow regulator) at least 10 psi higher than the back pressure exerted by the foam solution as it discharges into the vessel. A means for sensing the back pressure is provided by a pressure gauge 38, which is mounted on fitting 25. By observing the pressure gauge reading the operator can adjust the pressure to each flow regulator to overcome the back pressure and thus maintain the desired constant flow rate.

The desired quality of the foam phase generated in foam chamber 11 is achieved by maintaining the liquid and gas flow rates into the chamber according to known values based on engineering studies of fluid flow. From these studies it was determined that the superficial gas velocity should be between about 1.5 feet per second and 100 feet per second. For the water flow, the superficial velocity should be between about 0.7 feet per second and 10 feet per second.

The apparatus of this invention has several features which provide an improvement over the prior foam cleaning machines. For example, ammonium bifluoride, as well as other corrosion inhibiting compositions, may be used in the cleaning composition without detrimental effect to the gas disperser section in this apparatus. Another feature is that the acid solvent in the cleaning composition can be continuously diluted to a desired concentration within the apparatus. This eliminates the need for a separate batch mix step to dilute the solvent.

In the present apparatus the use of flow regulators to control the inlet flow provides a continuous and uniform blending of the gas and liquid streams. In the prior apparatus the sparger tubes are only partially submerged in the cleaning solvent contained in the aerator tanks, to provide a space in each aerator tank for the foam to accumulate. In the present apparatus the foam is generated by bubbling gas into a moving stream, thus eliminating the need for providing space for the foam to accumulate.

The invention claimed is:

1. An apparatus for making a foamed fluid useful for cleaning the interior surfaces of a vessel, which comprises:

- a first conduit which defines a foam chamber;
- a second conduit which communicates with the foam chamber, and which defines an inlet adapted for carrying a liquid concentrate into the foam chamber;
- a third conduit which communicates with the foam chamber, and which defines an inlet adapted for carrying a diluent liquid into the foam chamber, the diluent liquid thereby mixing with the liquid concentrate to form a liquid solution in the foam chamber;
- a first flow regulator means installed in the second conduit, and adapted for regulating the flow of the liquid concentrate into the foam chamber;
- a second flow regulator means installed in the third conduit, and adapted for regulating the flow of the diluent liquid into the foam chamber;
- a fourth conduit having a gas disperser section connected into one end, the fourth conduit being in communication with the foam chamber, the gas disperser section being positioned inside the foam chamber, and the fourth conduit defining an inlet adapted for carrying a gas into the foam chamber, the gas thereby being dispersed in the liquid solution to form a foamed fluid;
- a third flow regulator installed in the fourth conduit, and adapted for regulating the flow of the gas into the foam chamber;
- a fifth conduit which connects into the foam chamber, and which has at least one open end, the said open end being spaced from the foam chamber and adapted for connection into a discharge line which carries the foamed fluid to a vessel to be cleaned; and
- a mixing device which is positioned in the fifth conduit and is adapted for final mixing of the foamed fluid.

2. The apparatus of claims 1 in which the fifth conduit has two open ends, each open end being spaced from the foam chamber, and each open end being adapted for connection into a discharge line which carries the foamed fluid to a vessel to be cleaned.

3. The apparatus of claim 1 in which the fifth conduit has a plurality of openings therein, each opening being spaced from the foam chamber, and each opening being adapted for connection into a discharge line which carries the foamed fluid to a vessel to be cleaned.

4. The apparatus of claim 1 in which the gas disperser section is defined by a section of pipe having a number of spaced apart openings therein.

* * * * *